United States Patent
Parkvall et al.

(10) Patent No.: US 9,438,408 B2
(45) Date of Patent: *Sep. 6, 2016

(54) SCHEDULING IN A CELLULAR SYSTEM (71) Applicant: TELEFONAKTIEBOLAGET L M ERICSSON (PUBL), Stockholm (SE)

(72) Inventors: Stefan Parkvall, Stockholm (SE); David Astely, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,998

(22) Filed: Jan. 20, 2014

(65) Prior Publication Data
US 2014/0126528 A1 May 8, 2014

Related U.S. Application Data

(63) Continuation of application No. 12/275,883, filed as application No. PCT/SE2008/050524 on May 7, 2008, now Pat. No. 8,649,351.

(60) Provisional application No. 61/012,510, filed on Dec. 10, 2007.

(51) Int. Cl.
*H04L 5/00* (2006.01)
*H04W 72/12* (2009.01)
*H04W 72/04* (2009.01)
*H04L 1/16* (2006.01)

(52) U.S. Cl.
CPC ........ *H04L 5/0094* (2013.01); *H04W 72/0446* (2013.01); *H04W 72/1289* (2013.01); *H04L 1/1607* (2013.01)

(58) Field of Classification Search
None
See application file for complete search history.

(56) References Cited

U.S. PATENT DOCUMENTS 8,208,438 B2 6/2012 Han et al.
2009/0116573 A1* 5/2009 Gaal et al. .................... 375/267

FOREIGN PATENT DOCUMENTS

| CN | 1805318 A | 7/2006 |
|----|-----------|--------|
| WO | WO 2006107835 A1 | 10/2006 |
| WO | WO 2007083569 A1 | 7/2007 |
| WO | WO 2008074380 A1 | 6/2008 |

(Continued)

OTHER PUBLICATIONS

Twainese Office Action Dated Oct. 24, 2013, 6 pages.

(Continued)

*Primary Examiner* — Christine Duong (57) ABSTRACT

In a cellular system (100), transmissions are made (410) in subframes (310) which comprise subelements. The method is used for scheduling (415) first and second channels in a subframe, and comprises:

- dividing (420) the transmission resources for the first channel into a first set of resource groups,
- assigning (425) the resource groups of the first set to subelements in the subframe (310) in a predetermined fashion,
- assigning (430) a symbol value to all subelements (210) in the subframe (310) which have not been assigned a resource groups of the first set,
- dividing (435) the transmission resources for the second channel into a second set of resource groups,
- assigning (440) the resource groups of the second set to subelements in the subframe by means of said symbol values.

17 Claims, 5 Drawing Sheets

(56) References Cited

FOREIGN PATENT DOCUMENTS

| WO | WO 2008081004 A1 | 7/2008 |
|---|---|---|
| WO | WO 2008115003 A2 | 9/2008 |
| WO | WO 2008137864 A2 | 11/2008 |

OTHER PUBLICATIONS

Samsung. PHICH/PDCCH to RE mapping. 3GPP TSG RAN WG1 Meeting #50bis R1-074080. Oct. 8, 2007, the entire document.
Nokia, Nokia Siemens Networks, Control channel to RE mapping. 3GPP TSG RAN WG1 Meeting #50bis R1-074318, Oct. 8, 2007, the entire document.

IEEE Standard for Local and Metropolitan Area Networks Part 16: Air Interface for Fixed and Mobile Broadband Wireless Access Systems. Amendment 2: Physical and Medium Access Control Layers for Combined Fixed and Mobile Operation in Licensed Bands and Corrigendum 1.
"3rd Generation Partnership Project; Technical Specification Group Radio Access Network; Evolved Universal Terrestrial Radio Access (E-UTRA); Physical Channels and Modulation (Release 8)". 3GPP Standard; 3GPP TS 36.211. 3rd Generation Partnership Project (3GPP). Mobile Competence Centre ; 650. Route Des Lucioles ; F-06921 Sophia-Antipolis Cedex ;France. No. V8.1.0. Nov. 1, 2007. pp. 1-54. XP050377533. *paragraph [06.7] -paragraph [6.7.4]* * paragraph [06.9] -paragraph [6.9.3]*.

* cited by examiner

Prior Art

FIG. 3

Prior Art

SCHEDULING IN A CELLULAR SYSTEM

CROSS-REFERENCE TO RELATED APPLICATIONS

This application is a continuation of U.S. application Ser. No. 12/275,883, filed Nov. 21, 2008, pending, which was the national stage of international application no. PCT/SE2008/050024 filed May 7, 2008, which claims the benefit of U.S. Provisional Application No. 61/012,510, filed Dec. 10, 2007, the disclosure of which is incorporated herein by reference.

TECHNICAL FIELD

The present invention discloses a method and a device for scheduling in a wireless cellular system.

BACKGROUND

In the cellular system known as E-UTRAN, Evolved Universal Terrestrial Radio Access Network, also known as the Long Term Evolution system, LTE, the downlink transmissions (i.e. transmissions from the controlling node of a cell to users in the cell) are based on Orthogonal Frequency Division Multiplexing, OFDM, with OFDM symbols which can extend over a number of subcarriers and which have a certain extension in time as well.

Due to this, the E-UTRAN physical downlink resource can be seen as a time-frequency grid, comprising a number of resource elements, with each resource element corresponding to one OFDM subcarrier in one OFDM symbol interval.

In time, the E-UTRAN downlink transmissions are organized into so called radio frames, each of which comprises ten so called subframes with an extension in time of 1 ms, so that an E-UTRAN radio frame has a total extension in time of 10 ms.

In E-UTRAN systems, so called L1/L2 control signalling is used for transmitting downlink scheduling assignments, which are required for the users ("terminals") to properly receive, demodulate and decode downlink data, as well as uplink scheduling grants informing the terminals about resources and transport format for the uplink transmissions, together with hybrid-ARQ acknowledgements in response to uplink data transmission.

In E-UTRAN, the downlink L1/L2 control channels are mapped to the first 1-3 OFDM symbols within a subframe. Thus, each E-UTRAN subframe can be said to be divided into a control region and a data region, with the control region being first in time.

The size of the E-UTRAN control region is always equal to an integer number of OFDM symbols (1, 2 or 3 OFDM symbols can be used for control signalling) and can be varied per subframe, which maximizes the spectral efficiency as the control signalling overhead can be adjusted to match the instantaneous traffic situation.

The location of the control signalling at the beginning of the subframe is advantageous, as it enables a terminal to decode the downlink scheduling assignment (DL-SCH) prior to the end of the subframe. Decoding of the DL-SCH can thus begin directly after the end of the subframe, without having to wait for the decoding of the L1/L2 control information, which minimizes the delay in the DL-SCH decoding and thus the overall downlink transmission delay.

The E-UTRAN downlink L1/L2 control signalling consists of three different physical channel types:

PCFICH, the Physical Control Format Indicator Channel, which is used to inform the terminal of the number of OFDM symbols (1, 2, or 3) that are used for L1/l2 control signalling in the current subframe. At present, there is only one PCFICH in a cell.

PDCCH, the Physical Downlink Control Channel, which is used to carry downlink scheduling assignments and uplink scheduling grants. In addition, it may also be used for power control of a group of terminals. Typically, there are multiple PDCCHs in a cell.

PHICH, the Physical Hybrid-ARQ Indicator Channel, which is used to transmit ACK/NACK in response to reception of UL-SCH transmissions. Typically, there are multiple PHICHs in a cell.

A closer description of the PCFICH and PHICH control channels is as follows:

PCFICH—the Physical Control Format Indicator Channel

The PCFICH is used to indicate the number of OFDM symbols used for L1/L2 control signalling in the current subframe, or, equivalently, where in the subframe the data region starts. Reception of the PCFICH is thus essential to correct operation of the system. If the PCFICH is incorrectly decoded, the terminal will neither know where to find the control channels, nor where the data region starts, and will therefore lose any uplink scheduling grants transmitted, as well as any DL-SCH data transmission intended for the terminal.

At present, two bits of information, corresponding to a control region size of 1, 2, or 3 OFDM symbols, are coded into a 32-bit long sequence using a so called rate-1/16 simplex code. The coded bits are scrambled, QPSK-modulated, and mapped to 16 E-UTRAN OFDM resource elements. To be compatible with the different E-UTRAN transmit diversity schemes, which are specified in groups of 4 symbols, the 16 resource elements are grouped into 4 groups of 4 elements each. Such a group of 4 resource elements is sometimes referred to as a mini-CCE (Control Channel Element), also known as a resource-element group.

Frequency diversity is important for reliable PHICH reception. Therefore, the PCFICH is mapped to 4 mini-CCEs which are well separated in frequency. In the current 3GPP ($3^{rd}$ Generation Partnership Project) specifications, this is obtained by dividing the overall downlink system bandwidth into four equally-sized quarters with one mini-CCE in each quarter, so that the mini-CCEs used for PCFICH are equally spaced in frequency.

PHICH—the Physical Hybrid-ARQ Indicator Channel

The PHICH is used for transmitting hybrid-ARQ acknowledgements in response to UL-SCH transmission. There is one PHCIH for each terminal which expects an acknowledgement in the subframe.

Each PHICH carries one bit which is repeated three times, modulated, spread with a spreading factor of four, and then mapped to 3 mini-CCEs. Multiple PHICHs form a so called PHICH group, and the PHICHs within a PHICH group are code-multiplexed using different orthogonal spreading sequences, and share the same set of resource elements.

In similarity to the PCFICH, frequency diversity is important for the PHICH. At present, the exact mapping of PCFICH in E-UTRAN has not been decided in 3GPP, but ideally the 3 mini-CCEs used for a PHICH should be spread over the full system bandwidth.

Typically, the PHICH is transmitted in the first OFDM symbol only. However, in some propagation environments, this would unnecessarily restrict the PHICH coverage. To alleviate this, it is possible to configure a PHICH duration of three OFDM symbols, in which case the control region will be three OFDM symbols long in all subframes.

At present, there is no specification in E-UTRAN for the PHICH mapping. However, to use the same approach as for the PCFICH, i.e. to space the mapping of the three PHICH mini-CCEs equally over the system bandwidth might cause problems, since this could result in the PHCIH being mapped to the same set of resource elements as the PCFICH.

SUMMARY

Thus, as explained in the previous section, there is a need for a solution to the problem of scheduling or mapping the two control channels PCFICH and PHICH in an E-UTRAN subframe so that the risk of collisions is obviated. Ideally, such a solution should be possible to apply to virtually any two channels, not just two control channels, and should also not be restricted to downlink scheduling.

Such a solution is offered by the present invention in that it discloses a method for use in a wireless cellular communications system, in which system a controlling node controls the transmissions to and from users in a cell.

In a system in which the invention can be applied, transmissions are made in subframes with a certain extension in time and over a certain amount of subcarriers in frequency. The subframes comprise a number of subelements, and the method of the invention is intended for scheduling a first and a second channel in one and the same subframe.

The method comprises the steps of:
dividing the transmission resources needed for the first channel into a first set of resource groups,
assigning the resource groups of the first set to subelements in the subframe in a predetermined fashion,
assigning a symbol value to all subelements in the subframe which have not been assigned a resource groups of the first set,
dividing the transmission resources needed for the second channel into a second set of resource groups,
assigning, in a predetermined fashion, the resource groups of the second set to subelements in the subframe by means of said symbol values.

Thus, using the method of the invention, the resource groups of the second channel can only be assigned to subelements in the subframe which have not been assigned to resource groups of the first channel, which eliminates the risk of scheduling collisions.

In one embodiment of the invention, the resource groups of the second set are assigned to subelements in the subframe in such a manner that they are maximally spaced apart from each other in frequency, while, in another embodiment, the resource groups of the second set are assigned to subelements in the subframe in such a manner that they are spaced apart from each other in frequency in a predetermined fashion.

Suitably, the first and the second channel to which the invention is applied are control channels, although the invention is not restricted to being applied to control channels.

Also, in a preferred embodiment, the inventive scheduling is applied to downlink subframes, although it can also be applied to uplink subframes.

The invention also discloses a scheduling node for a system in which the invention is applied.

BRIEF DESCRIPTION OF THE DRAWINGS

The invention will be described in more detail in the following, with reference to the appended drawings, in which.

DETAILED DESCRIPTION

The invention will be described below with use of terminology from the E-UTRAN standards. However, it should be pointed out that this is merely in order to facilitate the reader's understanding of the invention, and is not intended to restrict the scope of protection sought for the invention, which can be applied other systems as well, where corresponding principles are used.

Figure 1:
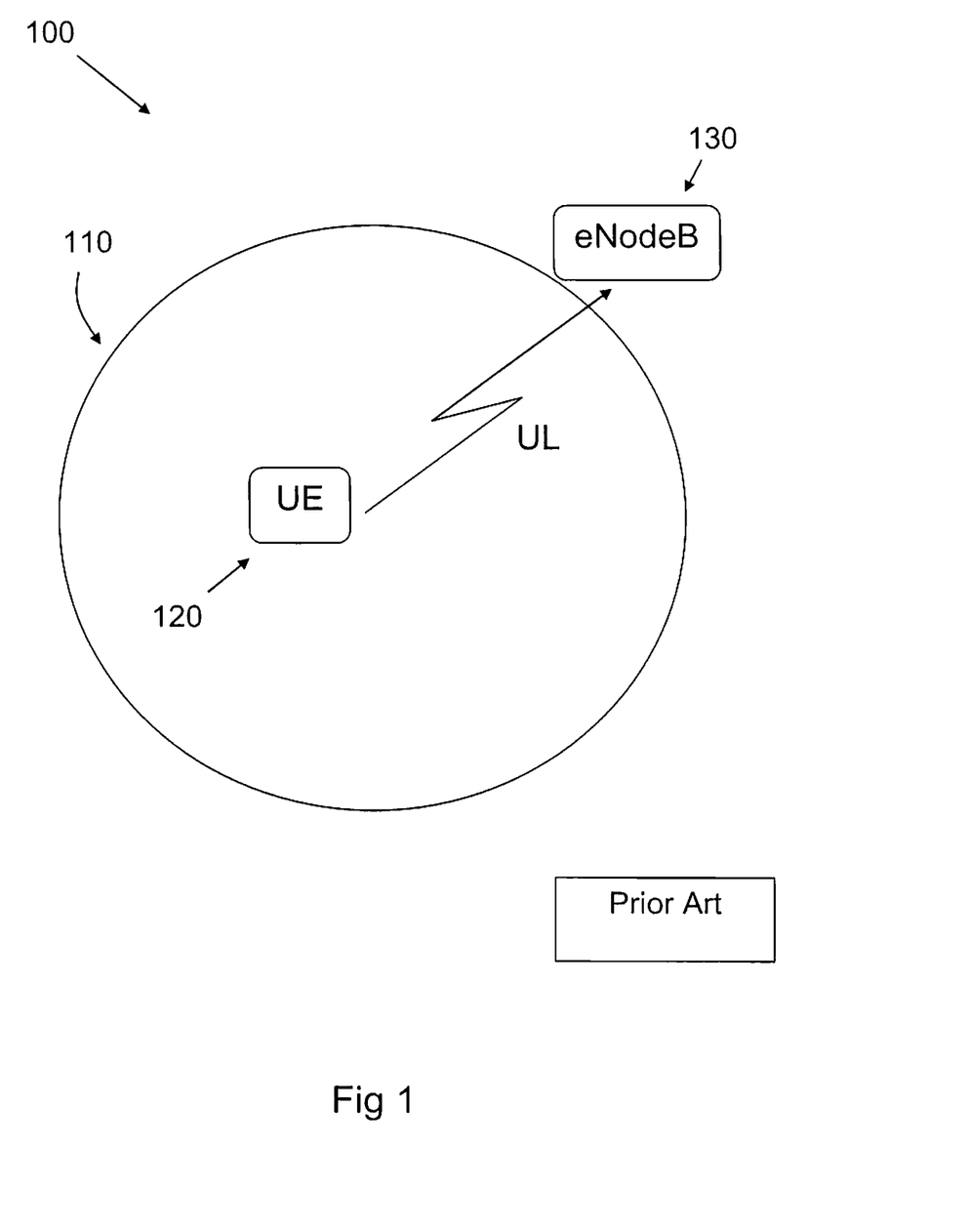
FIG. 1 shows an overview of a system in which the invention can be applied.

FIG. 1 shows a schematic view of a part of a system 100 in which the invention may be applied. Thus, the system 100 is a wireless cellular system which comprises a number of cells, one of which is shown as 110 in FIG. 1. Each cell can hold a number of users, one of which, 120, is shown as an example, and a controlling node 130, in E-UTRAN known as eNodeB, controls traffic to and from users 120 in the cell 110. Traffic from the users, ("UE", user terminal), to the eNodeB is referred to as uplink traffic, UL, and traffic in the other direction is referred to as downlink traffic, DL.

Figure 2:
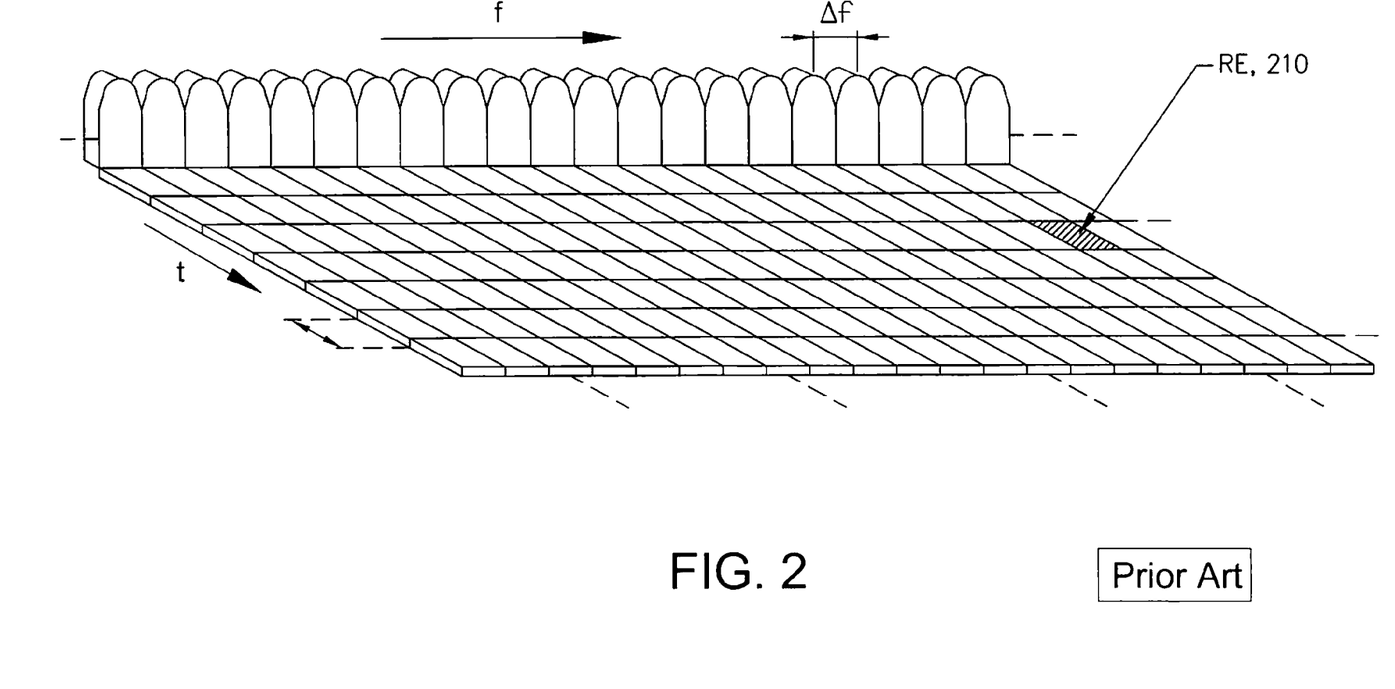
FIG. 2 shows downlink resources in the system of FIG. 1.

The principle of OFDM which is used in E-UTRAN systems was described in the previous section, and FIG. 2 shows pictorially the same principle, i.e. the E-UTRAN physical downlink resource as a frequency-time grid, with a number of resource elements, each of which corresponds to one OFDM subcarrier frequency (Δf) over one OFDM symbol interval. One resource element is indicated as RE 210 in FIG. 2, in order to further clarify the notion of resource elements.

The principle of radio frames in E-UTRAN which are organized into subframes of 1 ms each was also explained above, and FIG. 3 shows one such E-UTRAN subframe 310. As indicated in FIG. 3, and as was also explained in the previous section, the E-UTRAN control signalling, i.e. the L1/L2 control channels, is placed at the beginning (time-wise) of the E-UTRAN subframes.

Figure 3:
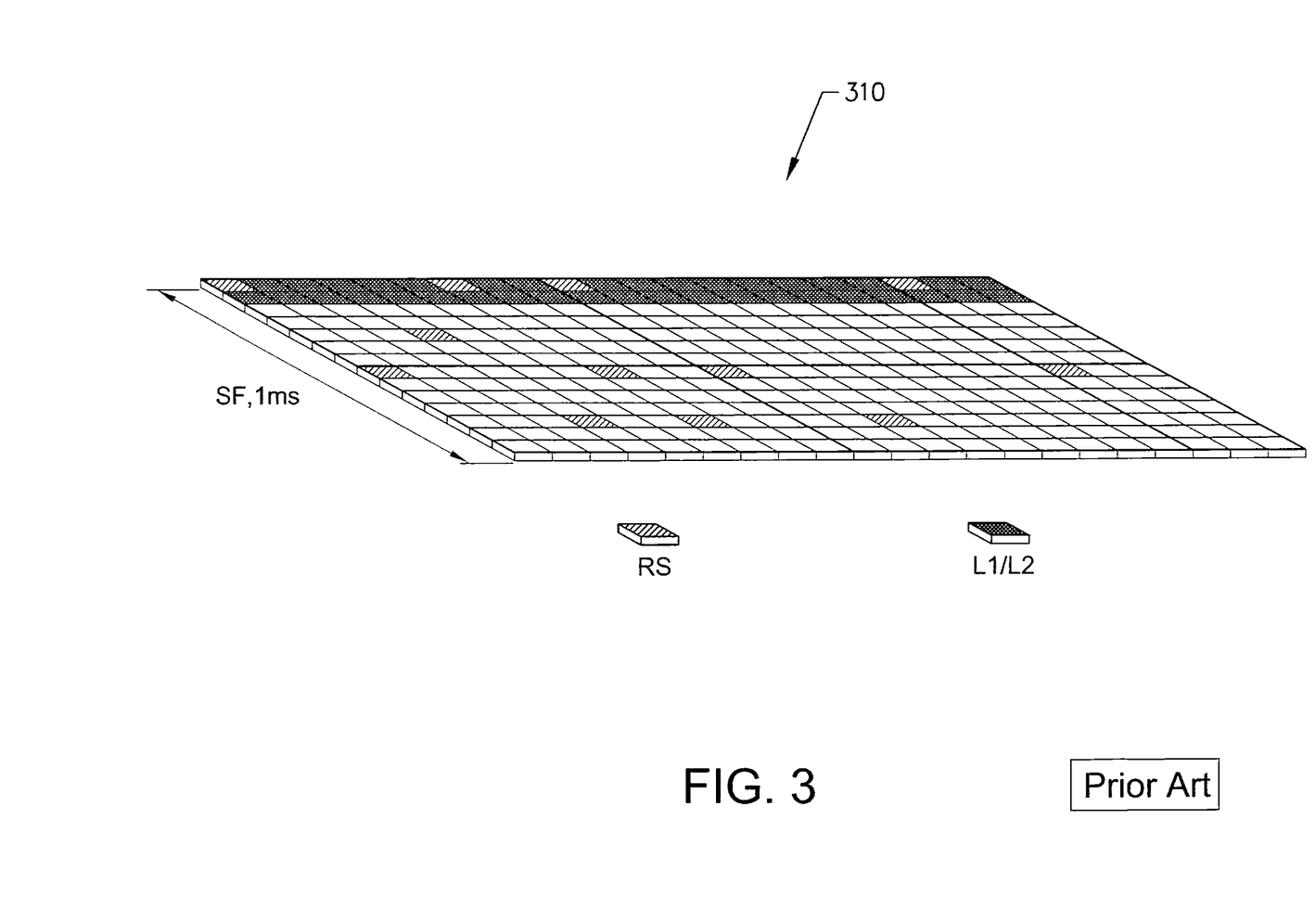
FIG. 3 shows a downlink subframe.

In a subframe such as the one 310 of FIG. 3, there will also be a number of reference symbols, which do not directly pertain to the invention, but which are shown as RS in FIG. 3, A purpose of the invention is to avoid scheduling collisions between control channels, in particular the PCFICH and the PHICH channel, i.e. the Physical Control Format Indicator Channel and the Physical Hybrid ARQ Indicator Channel.

The PCFICH uses sixteen E-UTRAN resource elements, grouped into four so called mini-CCEs, Control Channel elements, while the PHICH uses a number of mini-CCEs which is a multiple of three; the exact number of PHICH mini-CCEs depends on the number of terminals that expect an ACK/NACK in the subframe.

The E-UTRAN standard specifies how the four PCFICH mini-CCEs are to be scheduled in the subframes: The overall downlink system bandwidth is divided into four equally-sized quarters with one PCFICH mini-CCE in each quarter. The mini-CCEs used for PCFICH are thus equally-spaced in the frequency domain.

Thus, since the scheduling of the PCFICH is specified in the E-UTRAN standard, the invention needs to focus on how the PHICH mini-CCEs should be scheduled in the subframes in order to avoid collisions with the PCFICH mini-CCEs.

One principle of the invention is to assign a symbol value such as, for example, a number or a letter or a combination of those, to those mini-CCEs or subelements in the subframe which have not been assigned a PCFICH mini-CCE. The PHICH mini-CCEs are then assigned in a predetermined fashion to mini-CCEs in the subframe using these symbol values, which will lead to a subframe in which the PCFICH and the PHICH mini-CCEs will not be at risk of colliding.

As will be realized by the man skilled in the field, the exact manner in which the PHICH mini-CCEs are assigned to the subframe can be varied in a great many ways within the scope of the present invention; examples of principles which may be used are to either use an assignment method which assigns the PHICH mini-CCEs in such a manner that they are maximally spaced apart from each other in frequency and/or in time, or, alternatively, that they are spaced apart from each other in frequency and/or in time in some other predetermined fashion. However, other principles for this are also entirely possible within the scope of the present invention.

Two specific examples will now be given of how the principles of the invention may be applied:

Example 1

1. Let N denote the number of not yet allocated mini-CCEs in the subframe. Initialize N to the total number of mini-CCEs in the system bandwidth,
2. Let k denote the number of PHICH groups to which resources have been allocated. Initialize k to 0,
3. Allocate mini-CCEs to PCFICH,
4. Set N=N−4 (since four mini-CCEs are used for the PCFICH),
5. Number the mini-CCEs which remain after step 3 from 0 to N−1,
6. Allocate mini-CCE number 0, N/3 and 2N/3. If the divisions result in non-integer results, rounding can be used, e.g., through the "ceil" or "floor" operators,
7. Set k=k+1 (since one additional PHICH group has been allocated resources)
8. Set N=N−3 (three mini-CCEs used for the PHICH group)
9. If additional PHICH groups are to be allocated, go back to step 5, otherwise terminate the allocation.

Example 2

Another way of describing a mapping similar to that of example 1 is to specify the PHICH mapping relative to the PCFICH mapping. This could be done as follows:

1. Let N denote the number of not yet allocated mini-CCEs in the subframe. Initialize N to the total number of mini-CCEs in the system bandwidth,
2. Let k denote the number of PHICH groups to which resources has been allocated. Initialize k to 0. Allocate PCFICH resources. Let $n_0$ denote the number (in the frequency domain) of the first mini-CCE for PCFICH,
3. Allocate mini-CCEs number $n_0+k$, $n_0+N/3+k$ and $n_0+2N/3+k$ to PHICH group k. If either of these mini-CCEs collides with already allocated mini-CCEs, use the next higher mini-CCE number until no collision occurs (e.g. $n_0+N/3+k+1$, $n_0+N/3+k+2$, etc for the second mini-CCE of the PHICH group; similarly for the third mini-CCE in the group). If the divisions result in non-integer results, rounding can be used, e.g., through "ceil" or "floor" operators,
4. Set k=k+1 (one additional PHICH group has been allocated resources),
5. If additional PHICH groups are to be allocated, go back to step 4, otherwise terminate the allocation.

Figure 4:
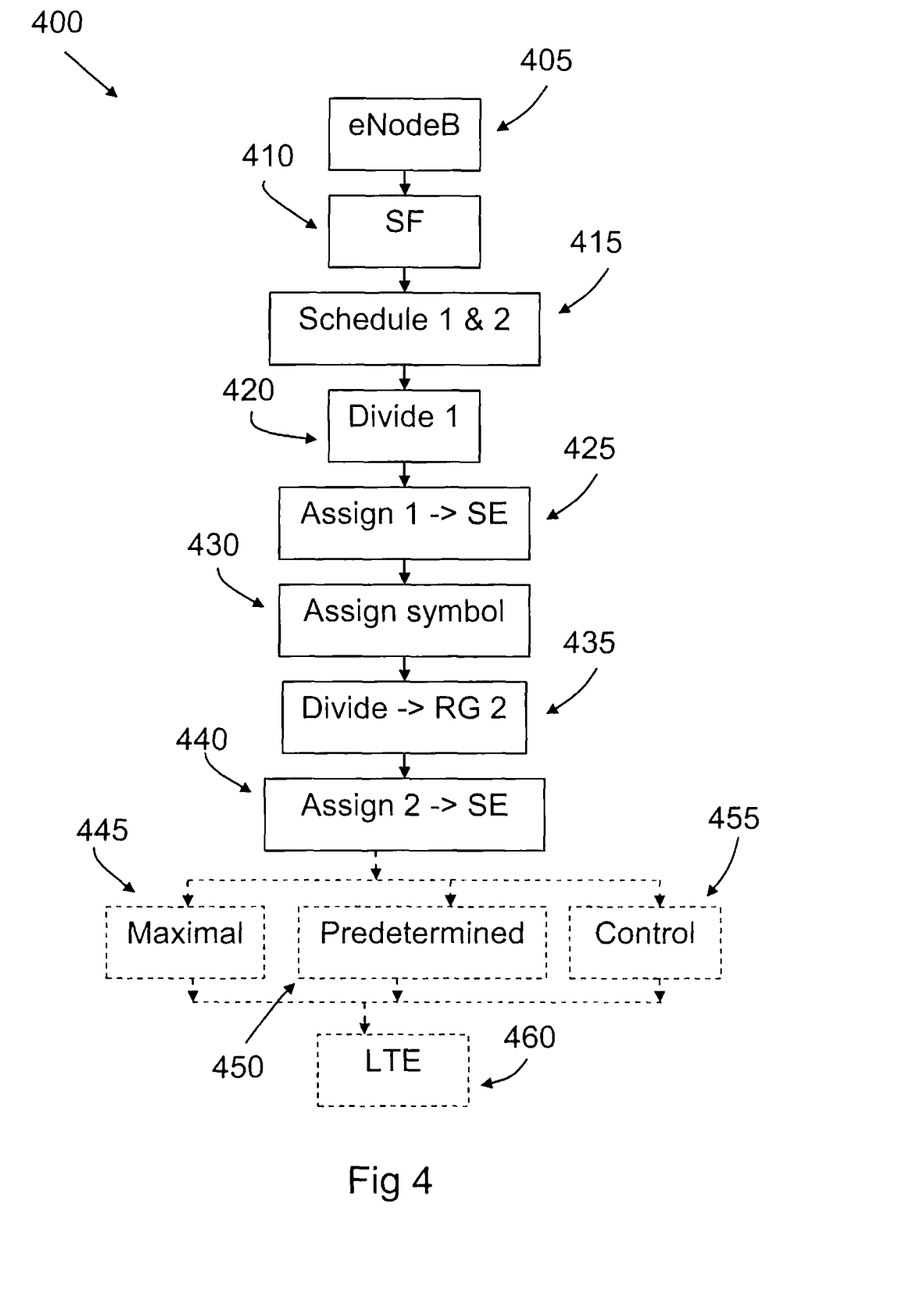
FIG. 4 shows a flow chart of a method of the invention.

FIG. 4 shows a schematic flow chart of a generalized method 400 of the invention. As has also emerged from the description above, the method 400 is intended for use in a wireless cellular communications system, and as indicated in step 405, according to the method 400, a controlling node such as an E-UTRAN eNodeB controls the transmissions to and from users in a cell.

Step 410 indicates that transmissions are made in subframes with a certain extension in time and over a certain amount of subcarriers in frequency, with the subframes comprising a number of subelements, and as shown in step 415, the method 400 is used for scheduling a first and a second channel in one and the same subframe.

The method 400 comprises the steps of:
Dividing, step 420, the transmission resources needed for the first channel into a first set of resource groups,
Assigning, step 425, the resource groups of the first set to subelements in the subframe in a predetermined fashion,
Assigning, step 430, a symbol value to all subelements in the subframe which have not been assigned a resource groups of the first set,
Dividing, step 435, the transmission resources needed for the second channel into a second set of resource groups,
Assigning, step 440, in a predetermined fashion, the resource groups of the second set to subelements 210 in the subframe by means of said symbol values.

As indicated in step 445, in one embodiment of the method, the resource groups of the second set are assigned to subelements in the subframe in such a manner that they are maximally spaced apart from each other in frequency, whilst, in another embodiment, as shown in step 450, the resource groups of the second set are assigned to subelements in the subframe in such a manner that they are spaced apart from each other in frequency in a predetermined fashion.

As indicated in step 455, in one embodiment of the invention, the first and the second channel are control channels.

Suitably, the method 400 is applied to a downlink subframe.

As shown in step 460, the method 400 may in one embodiment be applied to an E-UTRAN system, Long Term Evolution. In such an embodiment, the subelements are mini-CCEs, Control Channel Elements, also known as resource element groups, and the control channels are the PCFICH and PHICH channels, i.e. the Physical Control Format Indicator Channel and the Physical Hybrid ARQ Indicator Channel.

The invention also discloses a scheduling node for use in a cellular system in which the invention is applied. In a preferred embodiment, the inventive scheduling node is employed in a controlling node of the system, e.g. an eNodeB of an E-UTRAN system, although the scheduling node of the invention can of course also be employed in other nodes of the system.

Figure 5:
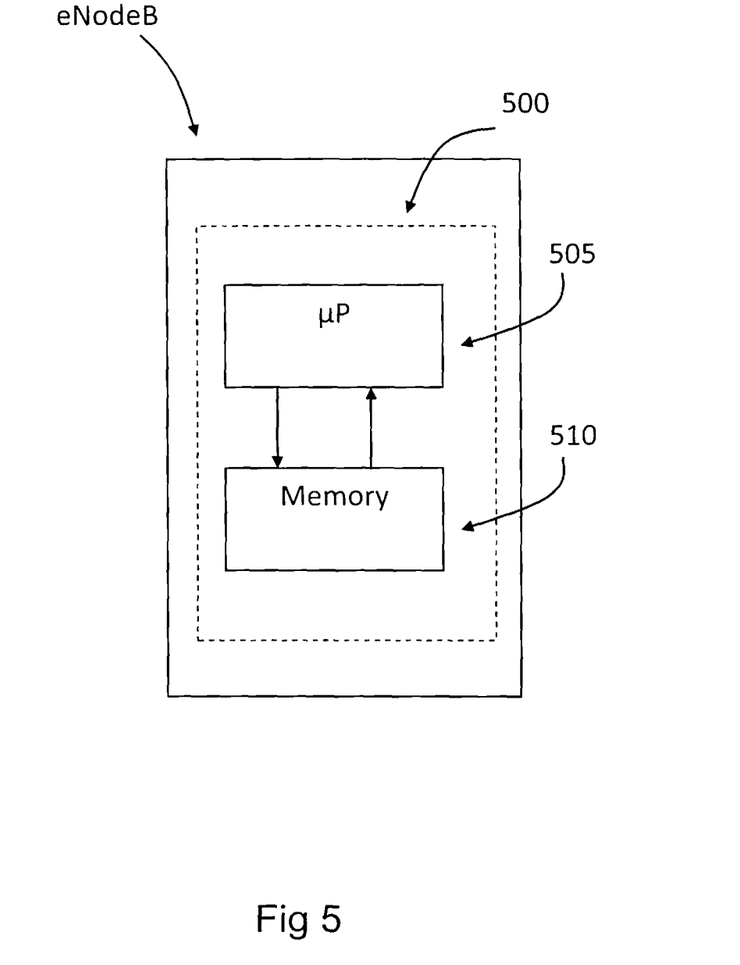
FIG. 5 shows a block diagram of a scheduling node of the invention.

The scheduling node of the invention will mainly be embodied in software, so that it will be stored in a memory from which it can be accessed and executed by a computer. For this reason, FIG. 5, which schematically shows an example of an embodiment 500 of a scheduling node of the invention shows the scheduling node 500 inside an eNodeB, in a memory 510 and a processor 505 such as a microprocessor. It should however, again be emphasized that the location of the scheduling node 500 in an eNodeB of an E-UTRAN system as shown in FIG. 5, is merely an example of a device in which the inventive scheduling node 500 can be utilized.

As has also emerged from the description above, the scheduling node 500 of the invention is intended for use in a cellular communications system in which transmissions to and from users are made in subframes which have a certain extension in time and which extend over a certain amount of subcarriers ($\Delta f$) in frequency. The subframes comprise a number of subelements, and the scheduling node 500 is adapted to schedule a first and a second channel in one and the same subframe.

The scheduling of the node 500 comprises:
dividing the transmission resources needed for the first channel into a first set of resource groups,
assigning the resource groups of the first set to subelements in the subframe in a predetermined fashion,
assigning a symbol value to all subelements in the subframe which have not been assigned a resource groups of the first set,
dividing the transmission resources needed for the second channel into a second set of resource groups,
assigning, in a predetermined fashion, the resource groups of the second set to subelements in the subframe by means of said symbol values.

In one embodiment of the scheduling node 500, the resource groups of the second set are assigned to subelements in the subframe in such a manner that they are maximally spaced apart from each other in frequency, whilst, in another embodiment, the resource groups of the second set are assigned to subelements in the subframe in such a manner that they are spaced apart from each other in frequency in a predetermined fashion.

Suitably, the first and the second channel to which the scheduling is applied are control channels, and in one embodiment, the scheduling node the scheduling to one or more downlink subframes.

Preferably, the scheduling node 500 is employed in an E-UTRAN system, suitably in an eNodeB of an E-UTRAN system.

The invention is not limited to the examples of embodiments described above and shown in the drawings, but may be freely varied within the scope of the appended claims.

The invention claimed is:

1. A method for use in a wireless cellular communications system, according to which method a controlling node controls the transmissions to and from users in a cell, and transmissions are made in subframes with a certain extension in time and over a certain amount of subcarriers ($\Delta f$) in frequency, said subframes comprising a number of subelements, the method being used for scheduling a first and a second channel in one and the same subframe, the method comprising the steps of:

distributing transmission resources needed for the first channel into a first set of resource groups;
assigning the resource groups of the first set to subelements in the subframe in a predetermined fashion, wherein each subelement comprises a group of four time-frequency resource elements;
assigning a symbol value to all subelements in the subframe which have not been assigned a resource groups of the first set;
distributing transmission resources needed for the second channel into a second set of resource groups; and
assigning, in a predetermined fashion, the resource groups of the second set to subelements in the subframe by means of said symbol values, wherein assigning the resource groups of the second set comprises:
determining a respective symbol value for one or more resource groups of the second set based on the number of subelements in the subframe which have not been assigned a resource group of the first set, and
assigning each resource group of the second set to a subelement associated with a respective symbol value determined for that resource group.

2. The method of claim 1, according to which the resource groups of the second set are assigned to subelements in the subframe in such a manner that they are maximally spaced apart from each other in frequency.

3. The method of claim 1, according to which the resource groups of the second set are assigned to subelements in the subframe in such a manner that they are spaced apart from each other in frequency in a predetermined fashion.

4. The method of claim 1, according to which the first and the second channel are control channels.

5. The method of claim 1, applied to a downlink subframe.

6. The method of claim 1, applied to an E-UTRAN system, Long Term Evolution.

7. The method of claim 6, according to which the subelements are mini-CCEs, Control Channel Elements, i.e. groups of four E-UTRAN resource elements.

8. The method of claim 4, according to which the control channels are the PCFICH and PHICH channels, i.e. the Physical Control Format Indicator Channel and the Physical Hybrid ARQ Indicator Channel.

9. A scheduling node for use in a cellular communications system in which transmissions to and from users are made in subframes which have a certain extension in time and which extend over a certain amount of subcarriers ($\Delta f$) in frequency, with the subframes comprising a number of subelements, the scheduling node being adapted to schedule a first and a second channel in one and the same subframe, comprising:

at least one processor unit communicatively coupled to a memory storing instructions thereon, when executed by the processor unit, configured to perform the scheduling comprising:
distributing transmission resources needed for the first channel into a first set of resource groups;
assigning the resource groups of the first set to subelements in the subframe in a predetermined fashion, wherein each subelement comprises a group of four time-frequency resource elements;

assigning a symbol value to all subelements in the subframe which have not been assigned a resource groups of the first set;

distributing transmission resources needed for the second channel into a second set of resource groups; and assigning, in a predetermined fashion, the resource groups of the second set to subelements in the subframe by means of said symbol values, wherein assigning the resource groups of the second set comprises:

determining a respective symbol value for one or more resource groups of the second set based on the number of subelements in the subframe which have not been assigned a resource group of the first set, and assigning each resource group of the second set to a subelement associated with a respective symbol value determined for that resource group.

10. The scheduling node of claim 9, in which the resource groups of the second set are assigned to subelements in the subframe in such a manner that they are maximally spaced apart from each other in frequency.

11. The scheduling node of claim 9, in which the resource groups of the second set are assigned to subelements in the subframe in such a manner that they are spaced apart from each other in frequency in a predetermined fashion.

12. The scheduling node of claim 9, in which the first and the second channel are control channels.

13. The scheduling node of claim 9, which applies the scheduling to a downlink subframe.

14. The scheduling node of claim 9, being employed in an E-UTRAN system, Long Term Evolution.

15. The scheduling node of claim 14, being employed in an eNodeB in an E-UTRAN system.

16. The scheduling node of claim 14, in which the subelements are mini-CCEs, Control Channel Elements, i.e. groups of four E-UTRAN resource elements.

17. The scheduling node of claim 12, in which the control channels are the PCFICH and PHICH channels, i.e. the Physical Control Format Indicator Channel and the Physical Hybrid ARQ Indicator Channel.

* * * * *

UNITED STATES PATENT AND TRADEMARK OFFICE
CERTIFICATE OF CORRECTION

PATENT NO. : 9,438,408 B2
APPLICATION NO. : 14/158998
DATED : September 6, 2016
INVENTOR(S) : Parkvall et al.

Page 1 of 2

It is certified that error appears in the above-identified patent and that said Letters Patent is hereby corrected as shown below:

On the Title Page

In Item (63), in Column 1, Lines 1-3, delete "filed as application No. PCT/SE2008/050524 on May 7, 2008," and insert -- filed on Nov. 21, 2008, --, therefor.

In Item (56), under "OTHER PUBLICATIONS", in Column 2, Line 1, delete "Twainese" and insert -- Taiwanese --, therefor.

In the Drawings

In Fig. 1, Sheet 1 of 5, delete "Fig" and insert -- Fig. --, therefor.

In Fig. 4, Sheet 4 of 5, delete "Fig" and insert -- Fig. --, therefor.

In Fig. 5, Sheet 5 of 5, delete "Fig" and insert -- Fig. --, therefor.

In the Specification

In Column 1, Lines 7-9, delete "pending, which was the national stage of international application no. PCT/SE2008/050024 filed May 7, 2008," and insert -- now Pat. No. 8,649,351, --, therefor.

In Column 2, Line 3, delete "L1/l2" and insert -- L1/L2 --, therefor.

In Column 4, Line 13, delete "applied, and" and insert -- applied, --, therefor.

In Column 4, Lines 14-15, delete "FIG. 1, and" and insert -- FIG. 1, --, therefor.

In Column 4, Line 16, delete "subframe, and" and insert -- subframe, --, therefor.

Signed and Sealed this
Twenty-seventh Day of June, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,438,408 B2

In Column 4, Line 60, delete "3," and insert -- 3. --, therefor.

In Column 5, Line 26, delete "PH ICH" and insert -- PHICH --, therefor.

In Column 5, Line 57, delete "resources)" and insert -- resources), --, therefor.

In Column 5, Line 59, delete "group)" and insert -- group), --, therefor.

In the Claims

In Column 8, Line 1, in Claim 1, delete "(Of)" and insert -- ($\Delta$f) --, therefor.